Patented July 5, 1932

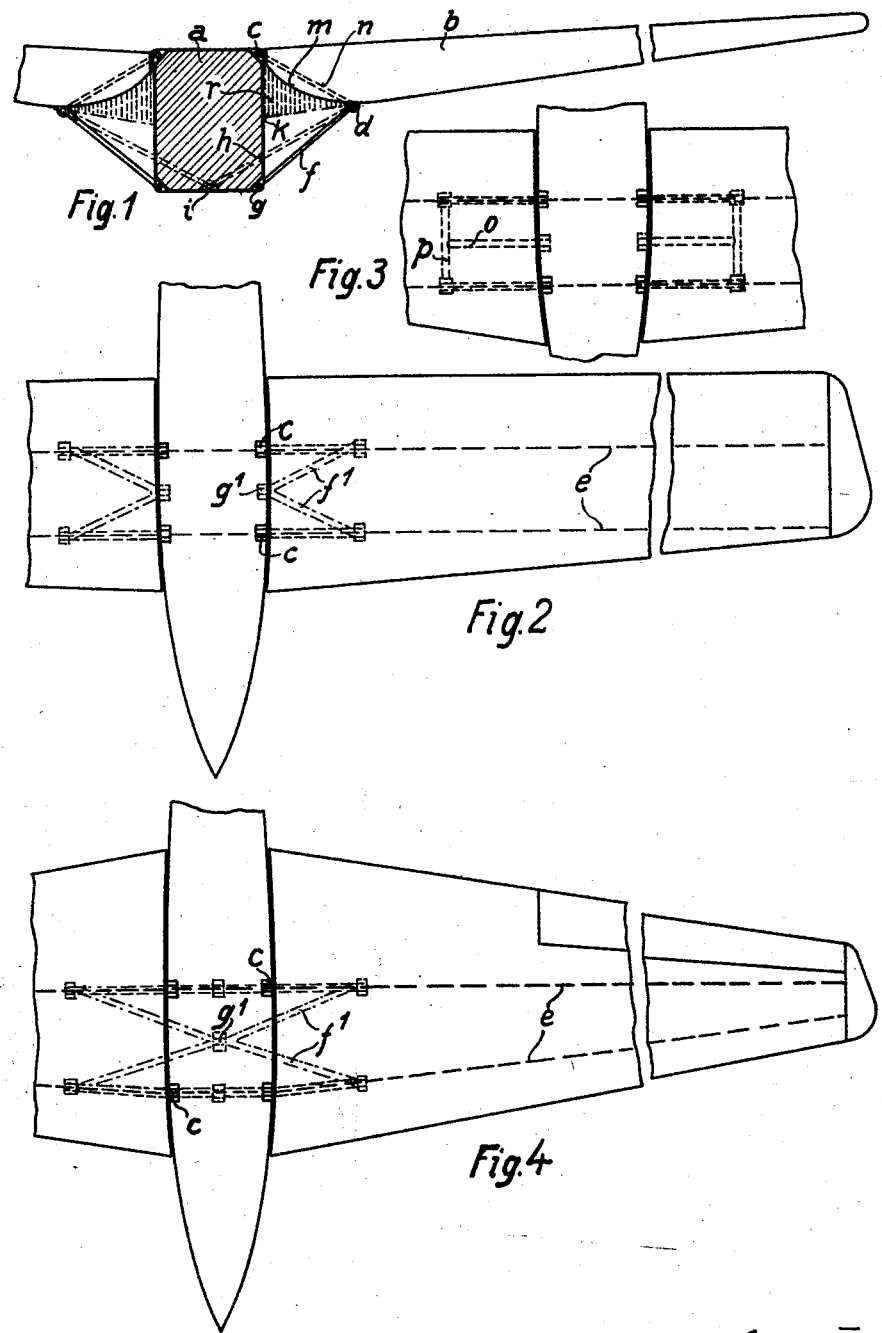

1,865,964

UNITED STATES PATENT OFFICE

ADOLF ROHRBACH, OF BERLIN-WILMERSDORF, GERMANY, ASSIGNOR TO ROHRBACH PATENTS CORPORATION, A CORPORATION OF DELAWARE

MONOPLANE

Application filed September 19, 1927, Serial No. 220,342, and in Germany September 27, 1926.

The connection of the wings with the fuselage of a monoplane is usually effected by making the wing spars extend continuously across the fuselage without reduction of vertical depth, the wing spars passing through the bottom or top of the fuselage or being located thereabove. The method of construction involving the passage of the wing spars all the way through the fuselage reduces substantially the effective height of the fuselage and the available space or room, which is particularly undesirable in commercial aircraft. A corresponding increase of the total height of the fuselage to compensate for this disadvantage would, of course, result in increased weight and air resistance. The arrangement of the wing on the top of the fuselage also results in an increase in weight and greater air resistance, although from a constructional standpoint this method of construction is simpler and is superior to the construction wherein the wings pass all the way through the fuselage, the latter involving difficult connections at the point where the fuselage is pierced by the wing spars. The disadvantages of the latter type of construction are naturally greater with wings having roots of great depth, namely, that type of construction which is the strongest and stiffest in proportion to the weight.

Monoplane structures are also known wherein the wings are attached to the sides of the fuselage and for the purpose of reducing the free length are also provided with supporting and bracing struts which are connected at their outer ends with the upper or lower surface of the wing somewhere near the middle thereof with their inner ends leading to suitable points of the fuselage. This method of construction has the disadvantage that the struts are rather long and heavy, and at the same time add substantially to the head or air resistance.

It has also been proposed in monoplane constructions to connect the wing halves to the fuselage with the bottom surface of the wing substantially on a level with the top of the fuselage, and the thick wing sections protruding up above the level of the fuselage. This type of construction has the disadvantage, among others that the aerodynamic efficiency at the wing roots is extremely poor, and this is aggravated by other incidental features of construction characteristic of this type of construction.

The object of the invention is a monoplane having the wings attached to the side of the fuselage with the upper curvature of the wings fairing into the intermediate fuselage part and particularly a monoplane wherein the wings are attached to the fuselage by means of a three-point connection including a direct connection or connections to the fuselage at the upper edge of the girder or girders and an indirect connection or connections from the lower edge of the girder or girders at the wing root to a lower part of the fuselage. In this construction the wing spars are interrupted at the hull, long external struts are avoided and an efficient convergency of the air flow of both the wing halves over the fuselage is obtained thereby approaching the ideal of a more or less elliptic distribution of the buoyancy forces. The invention is particularly applicable to wings having a pronounced taper towards their ends and a rather thick and deep base or root.

For a better understanding of the invention reference may be had to the accompanying drawing which shows more or less diagrammatically several modifications thereof wherein—

Fig. 1 illustrates a monoplane partly in vertical section and in front view, and Figs. 2 to 4 inclusive are plan views.

Referring first to Fig. 1 a monoplane is illustrated having a fuselage "$a$" and the wing halves "$b$" joined to its sides, it being observed that the upper surface of the wing merges or fairs into the top part of the fuselage. The wing halves "$b$" are observed to have thick roots and are of the cantilever type. Each of the wing halves "$b$" is connected or joined to the fuselage "$a$" from the points "$c$" and "$d$" located respectively on the upper and lower edges of the spars "$e$". There may be as many spars as desired and in the particular embodiment shown there are two such spars; these spars being disposed, for example, as indicated in Fig. 2. The connecting points "$c$" are located at the extreme inner upper edges of the wing spars and accordingly the wing halves are connected directly to the fuselage frame member by suitable fittings or joints at the points "$c$".

The points "$d$" are located a short distance away from the fuselage but still are positioned on the wing roots, and accordingly instead of being direct connected to the fuselage from the lower side of the wing the connections are effected by the short struts or ties "$f$", the latter being firmly connected at their inner ends to lower points of the fuselage frame as, for example, the lower edge of the fuselage, the struts "$f$" forming with the lines defined by the points "$c$" and "$d$" a very favorable angle for the distribution of the forces. In this modification the strut plane of each spar coincides with the plane formed by the connecting points $c$, $d$, and $g$. Instead of connecting the struts "$f$" to the lower side edge of the fuselage they may be connected at other convenient points, always, however, maintaining the proper angle with the line defined by the points $c$ and $d$. For example, the struts "$f$" may be connected at points "$h$" on the side of the fuselage slightly above the bottom thereof or may be extended further on and connected to the fuselage at points "$i$" on the bottom as indicated in broken lines, the bottom being correspondingly reinforced to carry the forces.

The rigid triangle formed by the points $c$, $d$, and $g$ of each spar connection ($c$, $d$, $h$ or $c$, $d$, $i$) transmits the forces transverse to the direction of flight. The forces acting in the direction of flight between the fuselage and the wing are transmitted through connections "$c$".

The tension occurring in the low spar girder is divided and transmitted from the point "$d$" to the connecting points "$c$" and "$g$" ($h$ or $i$). Thus the small portion of the wing root lying between the fuselage "$a$" and point or points "$d$" can assume the form best suited for the purpose without regard to structural height of the wing root, this part of the wing with this construction not being called upon to transmit any substantial force. For example, instead of having the wing root thickness extending all the way to the fuselage with the lower surface of the wing being continued to the point "$k$" the lower surface may be curved upwardly from the point "$d$", as, for example, represented by the line "$m$", so that the view through the windows on the side-wall of the fuselage is entirely unobstructed by the otherwise thick wing at this point. The points "$c$" and "$d$" of the spars may be connected by a straight strut "$n$" which transmits the forces by the shortest possible way.

In the modification of Fig. 2 the wing "$a$" is slightly of trapezoidal form and as indicated in dotted lines the short struts or ties "$f^1$" which correspond to the struts "$f$" of Fig. 1 lead to a mutual connecting point "$g^1$" of the fuselage and this point "$g^1$" may correspond in location either to the points "$g$" or "$h$" of Fig. 2 or the point "$i$" as, for example, illustrated in Fig. 4 where the struts "$f^1$" lead to a mutual point "$g^1$" or to similar points spaced in the fore and aft direction (corresponding to point "$i$") of Fig. 1. In Fig. 4 the wing is indicated as having a pronounced taper towards the wing tip.

In the modification as shown in Fig. 3 a three point connection of the wing near the fuselage is obtained by using instead of the two struts "$f$" or "$f^1$" a single strut "$o$", the latter being rigidly connected or joined to a strong rod or strut "$p$" connecting the fore and aft spaced points "$d$" on the bottom of the wing.

In some cases it may be advisable as, for example, for maintaining the profile of the wing to form the portion "$r$" of the wing root indicated by dotted lines and lying under the line "$m$" as a supplementary section or part which is transparent and permits of a ready outlook through the side windows of the fuselage. For example, a simple frame with a transparent covering sufficiently strong to resist the wind forces may be provided.

The arrangement would be just the inverse (mirror reflection), if the wing were connected to the bottom of the fuselage. The number of spars in the wing is obviously not restricted to two. Alternatively the direct connections of the wings to the fuselage may be at the bottom while the indirect connections by the struts may be at the top.

Having now particularly described and ascertained the nature of my said invention and in what manner the same is to be performed, I declare that what I claim is:—

1. In a monoplane of a cantilever type the combination of a fuselage with wings joined to the sides thereof one side of the wing being connected directly to the fuselage and the other side of the wing being connected to the fuselage wholly exteriorly thereof by a short inclined strut which is joined at one end to the fuselage and at the other end to the wing root at a point located a short distance from the fuselage in the direction of wing span.

2. In a monoplane of the character set forth in claim 1 wherein the upper surface of the wing fairs into the top of the fuselage.

3. A monoplane of the character set forth in claim 1 wherein the wing root is directly connected to the fuselage by a suitable fitting disposed at the inner end and upper edge of the spars and is indirectly connected thereto by means of short inclined struts leading from the fuselage frame at a point or points below the level of the direct connection and connected to the underside of the wing spars.

4. In a monoplane a fuselage and cantilever wings the spars of which are attached to the fuselage by means of a three point connection, one of said points being located on the upper spar edge adjacent to the fuselage and the inner end thereoef, another of said points being located on the lower spar edge and the third point being situated on the fuselage frame substantially below the level of the first mentioned connection point, the second and third points being connected by a tie member, the third point of connection being supported wholly exteriorly of the fuselage.

5. In a monoplane, a fuselage and cantilever wings the spars of which are attached to the fuselage by means of a three point connection each, one of said points being located on the upper spar edge adjacent to the fuselage and the inner end thereof, another of said points being located on the lower spar edge and the third point being situated on the fuselage frame substantially below the level of the first mentioned connection point, the second and third points being connected by a tie member, the two connection points located on the upper and lower edges respectively of each spar being interconnected by a straight tie.

6. A monoplane of a cantilever type having the wing halves discontinuous at the fuselage and attached to the sides thereof and having at least two longitudinal spars, each longitudinal spar being substantially thicker at its root end than at its tip end and being connected with the fuselage by means of a three point connection, one of these connections being located on the upper spar edge adjacent to the fuselage, another being on the lower spar edge removed slightly from the fuselage, while the third connecting point is situated at a substantial distance below the level of the first connecting point, the second and third points being connected by a strut which is entirely supported exterior of the fuselage, and the wing roots having thick aerodynamically efficient sections which in conjunction with the intermediate fuselage effect an efficient distribution of buoyancy over the whole wing span.

7. A monoplane of the character set forth in claim 6 wherein the struts running from the fuselage to the lower edges of the spars are connected at different points with the fuselage.

8. A monoplane of the cantilever type having the wing halves discontinuous at the fuselage and attached to the sides thereof and having at least two longitudinal spars, each longitudinal spar being substantially thicker at its root end than at its tip end and being connected with the fuselage by means of a three point connection, one of these connections being located on the upper spar edge adjacent to the fuselage, another being on the lower spar edge removed slightly from the fuselage, while the third connecting point is situated at a substantial distance below the level of the first connecting point, the second and third points being connected by a strut and the wing roots having thick aerodynamically efficient sections which in conjunction with the intermediate fuselage effect an efficient distribution of buoyancy over the whole wing span, the lower edges of the spars of a wing half being connected with the fuselage at a single point.

9. A monoplane of the cantilever type having the wing halves discontinuous at the fuselage and attached to the sides thereof and having at least two longitudinal spars, each longitudinal spar being substantially thicker at its root end than at its tip end and being connected with the fuselage by means of a three point connection, one of these connections being located on the upper spar edge adjacent to the fuselage, another being on the lower spar edge removed slightly from the fuselage, while the third connecting point is situated at a substantial distance below the lever of the first connecting point, the second and third points being connected by a strut and the wing roots having thick aerodynamically efficient sections which in conjunction with the intermediate fuselage effect an efficient distribution of buoyancy over the whole wing span, the lower edges of the wing spars of both wing halves being connected with the fuselage at a single point.

10. A monoplane of the character set forth in claim 6 wherein the four bracing struts of both wing halves meet in one single point of the fuselage.

11. A monoplane of the cantilever type having the wing halves discontinuous at the fuselage and attached to the sides thereof and having at least two longitudinal spars, each longitudinal spar being substantially thicker at its root end than at its tip end and being connected with the fuselage by means of a three point connection, one of these connections being located on the upper spar edge adjacent to the fuselage, another being on the lower spar edge removed slightly from the fuselage, while the third connecting point is situated at a substantial distance below the level of the first connecting point, the second and third points being connected by a strut and the wing roots having thick aerodynamically efficient sections which in conjunction with the intermediate fuselage effect an efficient distribution of buoyancy over the whole wing span, the wing roots between the connecting points of the spars tapering inwardly, the wing sections being supplemented by covering of transparent material.

12. A monoplane of the character set forth in claim 4 wherein the upper edges of the longitudinal spars are attached directly to the upper edge of the fuselage while the lower edges of the longitudinal spars are directly braced against the fuselage bottom edge.

13. In an airplane a fuselage a pair of wing halves discontinuous at the fuselage and attached thereto with the upper surface of the wing halves fairing into the upper part of the fuselage each wing spar being connected to the fuselage by means of a direct connection at the upper edge and inner end thereof, and indirectly connected to the fuselage through an intermediate connecting force transmitting member leading from the under side of the root portion of the wing downwardly to the fuselage frame and wholly supported exteriorly thereof.

14. In an airplane, a fuselage, a pair of wing halves discontinuous at the fuselage and attached thereto with the upper surface of the wing halves fairing into the upper part of the fuselage, each wing spar being connected to the fuselage by means of a direct connection at the upper edge and inner end thereof, and indirectly connected to the fuselage through an intermediate connecting force transmitting member leading from the under side of the root portion of the wing downwardly to the fuselage frame, the wing halves having thick wing roots and tapering both in width and depth towards the tips, with the portions of the wing roots between the fuselage and the lower connecting points of the spars tapering off.

15. In an airplane, a fuselage, a pair of wing halves discontinuous at the fuselage and attached thereto with the upper surface of the wing halves fairing into the upper part of the fuselage, each wing spar being connected to the fuselage by means of a direct connection at the upper edge and inner end thereof, and indirectly connected to the fuselage through an intermediate connecting force transmitting member leading from the under side of the root portion of the wing downwardly to the fuselage frame, the wing halves having thick wing roots and tapering both in width and depth towards the tips, with force transmitting means connecting the upper and lower connecting points of the spars.

In testimony whereof I have signed my name to this specification.

ADOLF ROHRBACH.